Oct. 22, 1968    D. I. LAWRENCE ET AL    3,407,348
LOGIC AND CONTROL CIRCUIT
Filed March 27, 1964                    3 Sheets-Sheet 1

INVENTORS.
DENNIS I. LAWRENCE
RAYMOND B. DICZHAZY
BY Bosworth, Sessions
Herrshow & Knowles
ATTORNEYS.

INVENTORS.
DENNIS I. LAWRENCE
RAYMOND B. DICZHAZY
BY Bosworth, Sessions
Herrstrom & Knowles
ATTORNEYS.

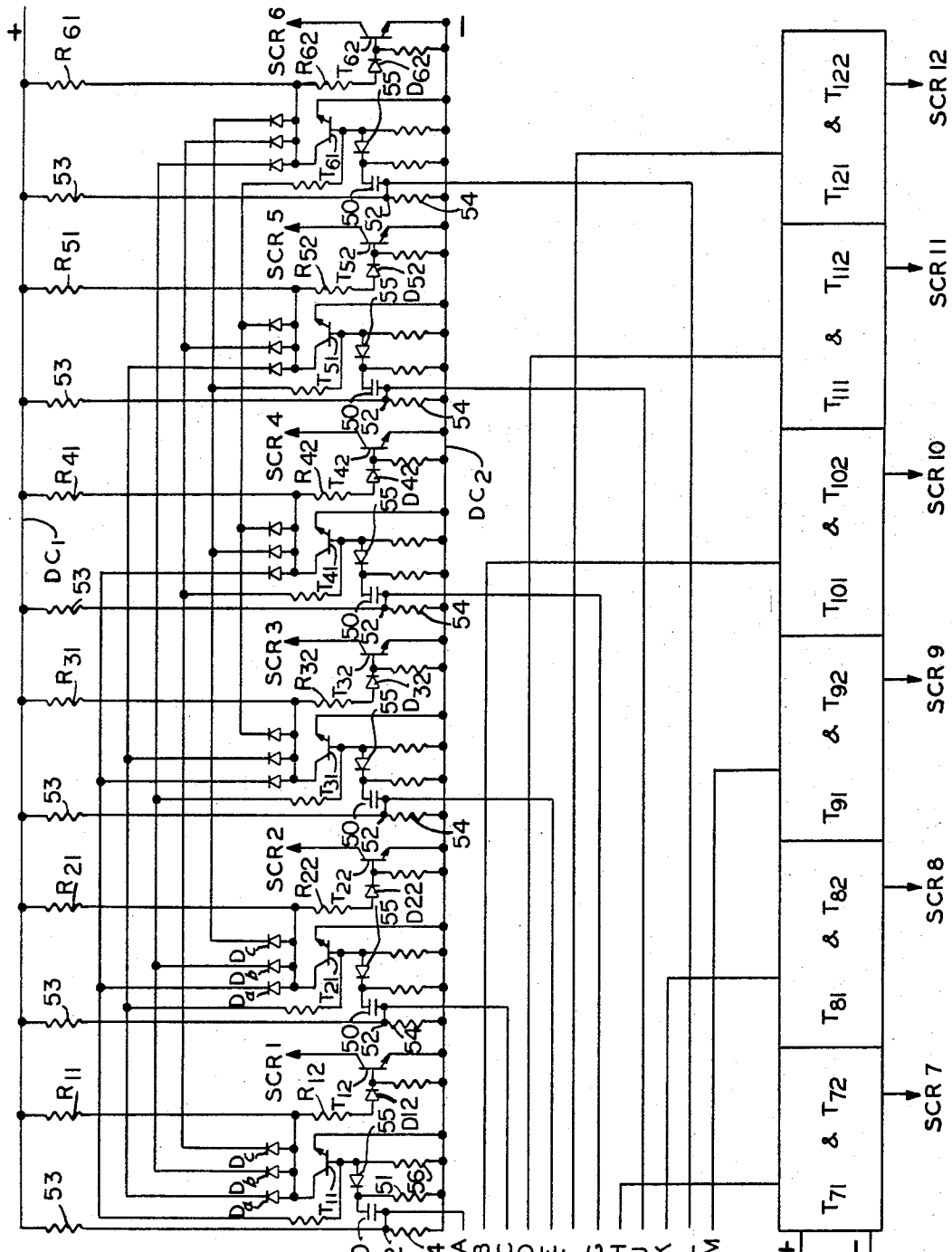

3,407,348
LOGIC AND CONTROL CIRCUIT
Dennis I. Lawrence, Solon, and Raymond B. Diczhazy, Bainbridge Township, Ohio, assignors to Lear Siegler, Inc., Los Angeles, Calif., a corporation of Delaware
Filed Mar. 27, 1964, Ser. No. 355,172
9 Claims. (Cl. 321—27)

ABSTRACT OF THE DISCLOSURE

Logic circuit means and, more particularly, circuit means for selectively controlling the conducting and non-conducting periods of the rectifying and switching devices making up a cycloconverter.

---

A cycloconverter characteristically supplies power from a higher frequency input circuit, generally polyphase, to a lower frequency load circuit which may be either single phase or polyphase. A cycloconverter can be operated from a constant frequency input to provide a variable frequency output as might be used, for example, in an adjustable speed alternating current motor drive. A cycloconverter can also be operated from a source of variable frequency and so controlled as to supply a constant frequency output.

A cycloconverter characteristically comprises two groups of rectifying and switching devices for each output phase; e.g., a positive group and a negative group. The rectifying and switching devices of both groups are so controlled that they are capable of acting alternately as rectifiers and as inverters so that, in operation, they go through cycles of rectification and inversion. This characteristic of their operation gives rise to the term "cycloconverter."

The rectifying and switching devices making up each group are connected in one of the well-known rectifier configurations. The output current from each group can flow in only one direction. Therefore, in order to apply an alternating output current, the positive and negative groups must be connected back to back with respect to the output circuit so that each group may alternately provide a half cycle of each full cycle of output current. Each half cycle provided by the positive and negative group is made up of portions of the higher frequency supply. The fabrication of the desired output wave form from the higher frequency alternating current supply requires that the appropriate one or ones of the rectifying and switching devices comprising each of the groups conduct and block current in a particular sequence and at particular times.

Typical rectifying and switching devices employed in cycloconverter circuits have a current-carrying anode-cathode circuit and a control electrode. These devices have a tendency to conduct whenever a signal is applied to the control electrode that is sufficiently positive with respect to the cathode at a time when its anode is sufficiently positive with respect to its cathode. The device, when thus fired, has a tendency to remain conducting independent of the signal applied to the control electrode until the anode becomes less positive than the cathode. Switching and rectifying devices of this type are, for example, mercury arc rectifiers, thyratrons and silicon controlled rectifiers and are referred to hereafter by the general designation "controlled rectifiers" as a convenience and not a limitation.

The firing of the controlled rectifiers is such that, at all times, phase commutation is achieved, i.e. the commutation of current from one controlled rectifier to the next due to natural voltage differences existing between the controlled rectifiers. The controlled rectifier which is to be fired is always at a higher potential in the direction of current flow than the controlled rectifier which is conducting.

The firing signals or the firing signal information may be derived from a polyphase voltage proportional to the polyphase higher frequency supply voltage and a lower frequency reference voltage. One known method for deriving such firing signal information employs a blocking oscillator or similar device which produces a series of sharp voltage spikes at times corresponding to the beginnings of conduction periods. Because such firing signals are applied to the control electrodes of the controlled rectifiers only momentarily, cycloconverters controlled by such firing signals tend to operate improperly, i.e. with low efficiency, poor wave form and high levels of distortion, when the output voltage contains transients. For instance, any transients occurring after a short-duration firing pulse which reduce applied anode voltages enough during a transient condition tend to prematurely and erroneously turn off a controlled rectifier. While the troublesome transient condition may exist for only a small part of the desired period of conduction of the controlled rectifier, the rectifier will not become conducting upon termination of the transient condition and restoration of sufficient anode voltage because there is no firing pulse present to reinitiate conduction.

Another known method for deriving the firing signals for operating cycloconverters consists of the algebraic combining of the high frequency supply phase voltages or voltages proportional thereto and the low frequency reference voltage and rectifying the combined wave form to provide continuous combined voltage outputs. These combined voltage outputs may be limited in amplitude, but, of course, provide pulses of rather long duration compared to the peaked output pulses produced by the blocking oscillators. The longer output pulses produced tend to overcome the problem of transients in the output voltage described above. They introduce other problems, however, in that the combined voltage wave forms may contain undesired or superfluous pulses and/or pulses of undesirably long duration which serve to hold certain of the controlled rectifiers conducting for too long a period and even to render conducting certain of the controlled rectifiers at times in the desired sequence of their operation when they should be non-conducting.

The two previously mentioned approaches for controlling the rectifying and switching devices of a cycloconverter have been utilized to produce useful, even though inefficient, power in certain applications. The advent of the small, lightweight semi-conductor device known as the silicon controlled rectifier (hereafter referred to as SCR) has made possible the use of cycloconverter frequency changers in airborne and space applications. In particular, cycloconverters employing SCR's can be used in a system to provide constant frequency electrical power from an alternating current generator driven at a variable speed and, therefore, having a variable frequency power output. Such variable speed constant frequency cycloconverter systems are required to produce power of a rather precisely regulated frequency and good sine wave form. The peaking pulse firing scheme and the continuous output combined voltage firing scheme mentioned above produces voltages that are of poor wave form and which contain high levels of distortion and are generally unsuitable for such constant frequency airborne and space applications.

It is one of the primary objects of our invention, therefore, to provide circuit means for controlling the periods of conduction and non-conduction of the controlled rectifiers a cycloconverter so that the output voltage of the cycloconverter faithfully follows a desired reference and contains relatively low levels of distortion. A further object is to provide circuit means which insures that the controlled rectifiers in a cycloconverter will turn on and off in the appropriate sequence to insure the desired output voltage. A further object is to provide such circuit means that effectively "forces" each controlled rectifier of a cycloconverter to turn on and remain on when appropriate in accordance with a programmed sequence of operation. It is also an object to provide such circuit means that effectively "forces" each controlled rectifier of a cycloconverter to turn off and remain off when appropriate in accordance with a programmed sequence of operation. It is a further object of our invention to provide such circuit means that insures against the premature turn-off of a conducting controlled rectifier in spite of load transients which might cause a reversal of anode-to-cathode voltage applied to it. Another object is to provide such circuit means that insures forced sequencing of the operation of the controlled rectifiers so that the firing signal must be removed from one rectifying and switching device before it is applied to the next-to-conduct controlled rectifier. Another object is to provide such circuit means that are useful in conjunction with cycloconverter power circuits arranged in various rectifier configurations and particularly in half wave and full wave bridge configurations. Yet another object is to provide such circuit means incorporating group switching or blanking of the firing signals to one or the other of the positive and negative groups of controlled rectifiers. Still another object is to provide such circuit means which produces sequentially timed firing pulses from the sum and difference voltages of the various phases of the polyphase higher frequency supply voltage and a reference voltage and from the negatives of such sum and difference voltages. A further object of our invention is to provide a reliable, lightweight and relatively economical firing circuit package for use in controlling cycloconverter frequency changers adapted to produce a constant or desired variable frequency output from a constant or variable frequency input in airborne and space applications as well as ground vehicular propulsion systems. Still another object is to provide such circuit means that is capable of controlling a cycloconverter so as to produce direct current from a alternating current supply.

The means and manner of accomplishing the foregoing objects of our invention together with other objects and advantages thereof will be apparent from the following description of a preferred embodiment of our invention together with the accompanying drawings in which:

FIGURE 5 is a circuit diagram showing in detail the logic section of the cycloconverter firing circuit shown diagrammatically in FIGURE 1.

Figure 1:
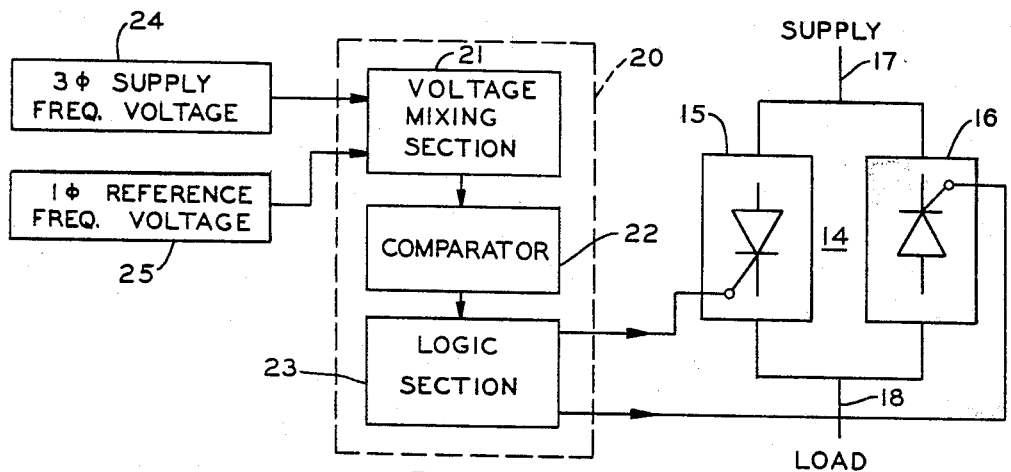
FIGURE 1 is a diagrammatic showing of one embodiment of the present invention in the environment of a cycloconverter and its associated and accessory circuits.

FIGURE 1 of the drawings diagrammatically shows a cycloconverter generally indicated by the reference numeral 14 and comprising a positive current conducting group 15 and a negative current conducting group 16. Positive and negative groups 15 and 16, respectively, are connected in parallel between a supply circuit 17 and a load circuit 18. As indicated by the controlled rectifier symbols within blocks 15 and 16, representing the positive and negative current conducting groups, the two groups are connected back to back with respect to the output or load circuit 18 so that each group may alternatingly provide a half cycle of each full cycle of output current.

While the supply and load circuits 17 and 18, respectively may be variously referred to as input and output circuits, it should be understood that the direction of power flow through the cycloconverter is reversible and power may be interchanged in either direction between the so-called supply and load circuits 17 and 18. The words "supply," "load," "input" and "output" are utilized variously herein merely as a matter of convenience.

Also, as shown in FIGURE 1, positive and negative groups 15 and 16 of the cycloconverter 14 are provided with firing signals from a firing circuit indicated generally at 20. Firing circuit 20 consists of voltage mixing section 21, comparator 22 and logic section 23 interconnected generally as shown in FIGURE 1.

Voltage mixing section 21 develops firing signal information from a polyphase source 24 of high frequency voltages proportional to the high frequency voltages supplying the cycloconverter power circuit and a source 25 of single phase voltage of the desired output frequency of the cycloconverter.

Comparator 22 consists of a number of bistable multivibrator flip-flop circuits interconnecting voltage mixing section 21 and logic section 23 and performing a pulse-forming and voltage comparing function.

Logic section 23 includes the means for taking the output pulses of the flip-flops comprising comparator 22 and producing firing pulses for the SCR's in the cycloconverter power circuit which insure their proper firing sequence and duration of conduction and prevent their improper firing sequence and duration of conduction.

Figure 2:
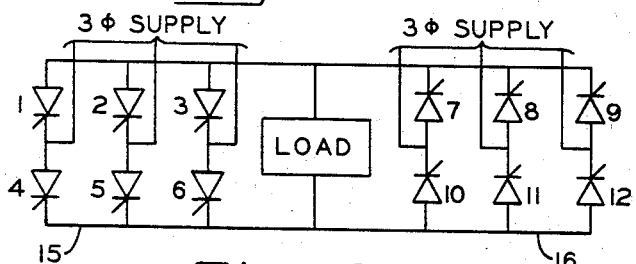
FIGURE 2 is a simplified showing of the power circuit of the cycloconverter diagrammatically shown in FIGURE 1 and including the individual SCR's and their interconnections.

FIGURE 2 is a simplified showing of a cycloconverter power circuit having a three-phase supply or input and a single phase output. Each group 15 and 16 consists of six SCR's arranged in a conventional full wave rectifier configuration. It will be apparent that conduction between any two phases supplying one of the groups requires the firing or turning on of two SCR's in the group. It will also be apparent that in positive group 15, for example, one of the two conducting SCR's must be in the set consisting of SCR's 1, 2 and 3 and the other must be one of the set consisting of SCR's 4, 5 and 6. It is also necessary, of course, that only one of the SCR's in sets 1–3 and 4–6 conducts at a time; and, further, that the two SCR's connected directly to a particular supply phase be prevented from conducting at the same time. For example, steps must be taken to prevent the simultaneous conduction by SCR's 1 and 4 directly connected to the same supply phase. Similar criteria for the proper operation of the cycloconverter apply to negative group 12. These criteria constitute the criteria of operation for the firing circuit of this invention.

Figure 3:
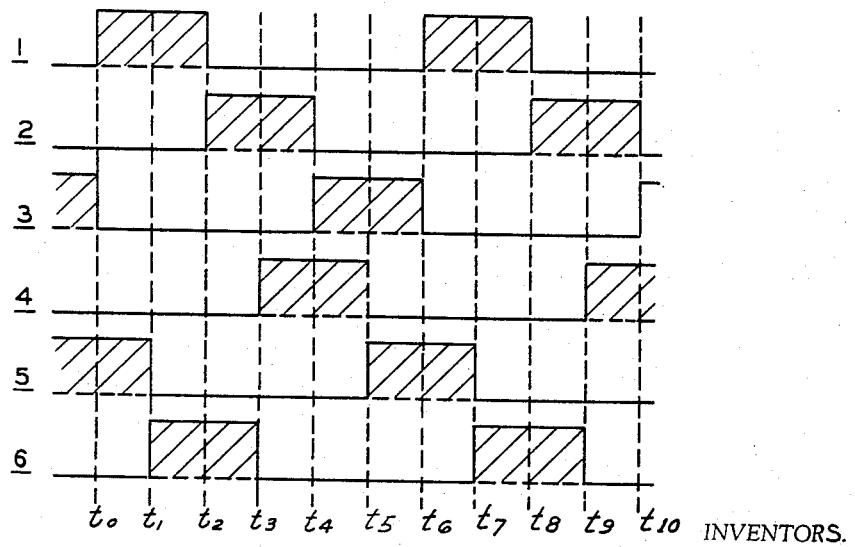
FIGURE 3 is a diagram illustrating the operation of one group of the cycloconverter.

FIGURE 3 shows in diagrammatic form the relationship of the periods of conduction and non-conduction of SCR's 1 through 6 comprising positive group 15. The positive and cross-lined portions of the wave forms indicate the periods of conduction. It will be noted that the criteria of operation are met in that one and only one SCR of the set consisting of SCR's 1, 2 and 3 conducts at a time and one and only one of the SCR's of the set consisting of SCR's 4, 5 and 6 conducts at a time; and, further, that the two SCR's connected directly to each supply phase are not permitted to conduct simultaneously. It will also be noted that there occurs an overlap in the conduction period of one of the SCR's of the 1–3 set and portions of the conduction periods of two of the SCR's of the 4–6 set. Note, for example, that SCR 1 begins to conduct at time $t_0$ and continues to conduct until time $t_2$. At time $t_0$, SCR 5 is in the middle of its conduction period which ends at time $t_1$ or the middle of the conduction period of SCR 1. At time $t_1$, SCR 6 begins to conduct and continues to conduct past the termination of the conduction period of SCR 1 and into the conduction period of SCR 2. In accordance with the criteria of operation set forth above, only SCR's 5 and 6 are permitted to conduct during the conduction period of SCR 1 because they are the only two SCR's in the 4–6 set that are not directly connected to the same supply phase as SCR 1.

A diagram of the conduction and non-conduction periods of the SCR's comprising negative group 16 is similar to FIGURE 3. It will be noted in FIGURE 3 that the conduction periods are all equal in time and, therefore, illustrate the condition of operation of the cycloconverter in which the reference frequency is zero and the supply voltage frequency is being converted into a direct current output voltage. While this is a somewhat special case, it provides a diagram that is more simple and easy to understand than that illustrating an alternating current output of frequency different from the frequency of alternating current supply. The criteria illustrated in FIGURE 3 are just as valid for the higher-to-lower frequency condition of operation.

The desired operation of a cycloconverter as illustrated by FIGURE 3 can be insured by providing firing pulses to the respective SCR's in the cycloconverter power circuit that correspond to the desired periods of conduction and non-conduction of the SCR's. In other words, referring to FIGURE 3, if SCR 1 and only SCR 1 of the 1–3 set of SCR's is supplied with a firing voltage from time $t_0$ to $t_2$ and SCR's 2 and 3 of the same set are not supplied with firing voltages during the same time period, only SCR 1 can and must conduct during that time period assuming the proper phase relationship with the supply voltage connected directly to SCR 1. It will be apparent that the correspondence between the firing pulses provided to the various SCR's and the desired periods of conduction illustrated in FIGURE 3 will result in the desired operation of the cycloconverter. The logic section of the firing circuit of this invention provides such firing pulses or voltages to the cycloconverter SCR's from the information derived from the voltage mixing section and comparator.

Figure 4:
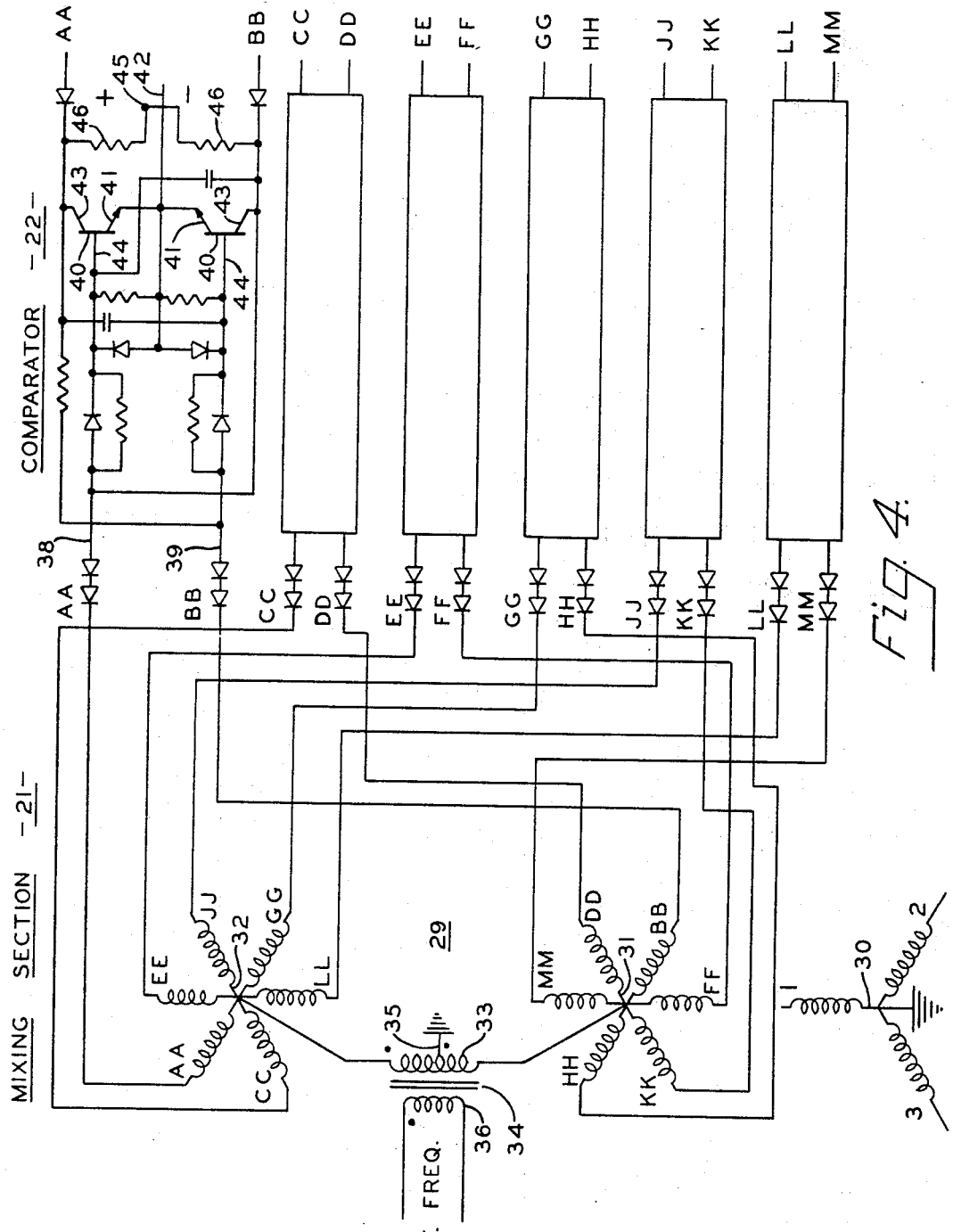
FIGURE 4 is a circuit diagram showing in detail the voltage mixing and comparator sections of the cycloconverter firing circuit shown diagrammatically in FIGURE 1.

The circuit diagram of a preferred voltage mixing section and comparator is shown in FIGURE 4. The voltage mixing section comprises a transformer 29 consisting of a star-connected, three-phase primary winding 30 and two six-phase, star-connected secondary windings 31 and 32, the neutrals of which are connected to opposite ends of the secondary winding 33 of reference frequency input transformer 34. Secondary winding 33 of reference frequency transformer 34 has a grounded center tap 35 and a single phase primary winding 36.

It will be apparent that the voltages appearing at the free ends of the six-phase windings of each of the secondaries 31 and 32 of transformer T each comprise a unique combination of one of the polyphase voltages applied to primary winding 30, i.e. polyphase voltages proportional to the polyphase supply voltages of the cycloconverter, and the voltage applied to primary winding 36, i.e. the reference frequency voltage. This arrangement of transformer windings and primary winding excitation provides voltages proportional to the sums and differences of each of the phases of the supply frequency voltage and the reference frequency voltage and the negatives of these sum and difference voltages. Thus, there are developed twelve different and unique voltage wave forms whose positive- and/or negative-going crossings through zero voltage provide the desired firing signal information for controlling the twelve SCR's of the cycloconverter power circuit so that they will conduct current in a manner to produce a single phase output of the reference frequency from the polyphase supply frequency voltage. The means and manner of developing this information and the information developed by the voltage mixing described above is well known. Any other means for providing the same or similar information may be employed with the firing circuit of this invention in the manner set forth below.

As seen in FIGURE 4, the comparator comprises six identical bistable multi-vibrator or flip-flop circuits, one of which is shown in detail. The others are indicated only by boxes because they are the same as the one shown.

Two of the twelve unique voltage wave forms produced by the voltage mixing section are applied to the signal inputs of each comparator flip-flop. The two voltages applied to each flip-flop are identical except that one is of the opposite polarity. For example, the voltages applied to the inputs 38 and 39 of the flip-flop circuit illustrated in detail might be the voltage wave forms made up of the sum of supply frequency phase voltage 2 and the negative of the sum of the same voltages. Since the twelve wave forms comprising the output of the voltage mixing section are the sums and differences of each of the three phases of the supply frequency voltage and the reference frequency voltage and the negatives of these sum and difference voltages, there are six corresponding pairs of similar and opposite polarity voltage waves available for the two inputs of each of the six comparator flip-flops.

Each of the flip-flops is conventional and comprises generally a pair of switching transistors 40 having their emitters 41 tied together and connected to the negative side 42 of a D.C. power supply. The collector 43 of each is cross-coupled to the base 44 of the other. The positive side 45 of the D.C. power supply is connected through collector-limiting resistors 46 to collectors 43.

Each flip-flop is initially at rest in either one of its stable states. When triggered by a suitable pulse applied to one of the inputs 38 or 39 from voltage mixing section 21, the circuit switches to its second stable state where it remains until triggered by another suitable pulse. As shown, the circuit may be switched by the application of a negative trigger pulse to the base of that transistor 40 which is off or a positive trigger pulse to the base of that transistor 40 which is on. The operation of the circuit shown is fundamentally the same as that of a basic Eccles-Jordan bistable multi-vibrator well known in the art.

The output of each flip-flop circuit consists of two square wave voltages appearing between collector 43 and ground of each of the transistors 40. The square wave outputs of each flip-flop unit will be similar to each other but of opposite polarity and will comprise square pulses whose duration is related to the combined sinusoidal wave form supplied the inputs 38 and 39 from the voltage mixing section 21. Altogether, the comparator will provide twelve square wave outputs, each of which appears between the collector and ground of a transistor making up the six flip-flop units. For convenience, these twelve outputs have been designated as shown in FIGURE 4 as AA, BB, CC, DD, EE, FF, GG, HH, JJ, KK, LL and MM. The square wave outputs appearing at each of these output terminals is utilized by the following logic section next described.

The logic section is shown in detail and will be described in connection with FIGURE 5. The complete circuitry is shown for one-half of the logic section intended to supply the firing pulses to the control electrodes or gates of the SCR's of one-half of a full-wave, bridge-type cycloconverter power circuit as shown in FIGURE 2. The other half of the logic section, as will be apparent to one skilled in the art, which provides the control signals to the gates of the SCR's of the other half of such a cycloconverter is identical with the first half of the logic section and is by a box outline. The signals produced by one-half of the logic section correspond to but are 180° out of phase with the signals produced by the other half of the logic section.

Positive group 15, for example, of a full-wave, bridge-type cycloconverter contains six SCR's designated 1 through 6 as shown in FIGURE 2 and as uniformly identified throughout this description. That half of the logic section which supplies gate signals to SCR's 1 through 6 comprises twelve NPN transistors, or one pair for each SCR. The pair of transistors associated with SCR 1 is designated $T_{11}$ and $T_{12}$; the pair associated with SCR 2, $T_{21}$ and $T_{22}$; the pair associated with SCR 3, $T_{31}$ and $T_{32}$; and so on. Transistors $T_{11}$, $T_{21}$, $T_{31}$ etc., of the pairs are operated in a switching mode in response to signals from the comparator section and, for convenience, are hereafter referred to generally as "switching transistors." Transistors of the pairs designated $T_{12}$, $T_{22}$, $T_{32}$, etc., have their bases in circuit with the collector circuit of their associated switching transistor and their collector circuit connected to the control electrodes of their associated SCR's. Transistors $T_{12}$, $T_{22}$, $T_{32}$, etc., are operated in a switching mode and may aptly be characterized as "power transistors" for supplying a switched signal to the gate of their associated SCR's. When transistors $T_{12}$, $T_{22}$, $T_{32}$, etc., are conducting through their collector-emitter circuit in response to an appropriate base signal, the SCR associated with and connected to the collector circuit of each receives a firing or "turn-on" current pulse. Power transistors $T_{12}$, $T_{22}$, $T_{32}$, etc., are conducting or "turned on" when their associated switching transistors $T_{11}$, $T_{21}$, $T_{31}$, etc., respectively are non-conducting or "turned off."

The logic section is supplied with direct current power from a D.C. source (not shown) through a positive bus $DC_1$ and a negative bus $DC_2$. The collector-emitter circuit of switching transistors $T_{11}$, $T_{21}$, $T_{31}$, etc., are connected across the positive and negative sides $DC_1$ and $DC_2$ of the power supply through a limiting resistor $R_{11}$, $R_{21}$, $R_{31}$, etc., respectively. The base of each of power transistors $T_{12}$, $T_{22}$, $T_{32}$, etc., is connected to the collector of its associated switching transistors $T_{11}$, $T_{21}$, $T_{31}$, etc., respectively, through a series combination of a limiting resistor and diode designated $R_{12}$, $R_{22}$, $R_{32}$, etc., and $D_{12}$, $D_{22}$, $D_{32}$, etc., respectively. The emitter of each power transistor $T_{11}$, $T_{21}$, $T_{31}$, etc., is connected to direct current bus $DC_2$.

It will be apparent from the foregoing description of the general arrangement and relationship of the six pairs of switching and power transistors in the positive half of the logic section that a signal inversion takes place between the switching and power transistors of each pair; and, when the switching transistor of each pair is conducting or "on," its associated power transistor is non-conducting or "off" and vice versa. Without anything more in the way of interconnections between the switching and the power transistor pairs, the SCR's of the positive group of the cycloconverter associated with the six positive transistor pairs of the logic section could be turned on in accordance with and in response to appropriate turn-off signals applied to the base of the switching transistors of the six pairs.

As described above, it is necessary that the SCR's making up each current-carrying group of the cycloconverter be fired in a particular order or sequence within their group. In addition, these SCR's must be turned off and their non-conducting state insured at and during particular times and time intervals in the firing sequence. As explained above, the criteria for insuring the proper and desirable conducting and non-conducting relationships of the six SCR's of the positive group, for example, are as follows. (1) Only one of the set of SCR's designated 1, 2 and 3 conducts at a time. (2) Only one of the SCR's of each pair of SCR's directly in circuit with each of the supply phases conducts at a time. In accordance with these criteria, therefore, if SCR 1 is conducting, SCR's 2, 3 and 4 must all be non-conducting; and if SCR 3 is conducting, SCR's 1, 2 and 6 must all be non-conducting.

The criteria stated above in terms of the conducting or non-conducting state of the SCR's can be similarly stated for the power transistors associated with each of them in the logic section. Because of the inversion accomplished between the switching and power transistor of each of the six SCR-associated transistor pairs, a criteria comprised of corresponding but opposite sets of conditions from the above-stated criteria prescribes the operation of the switching transistors.

The relationship between the conducting and non-conducting states of the SCR's and their associated power transistors in the logic section are the same and are represented diagrammatically in FIGURE 3 as explained and described above.

The means for insuring the conducting and non-conducting operating sequence and relationship represented by the criteria stated above and shown diagrammatically in FIGURE 3 comprises a diode logic circuit associated with each of the six switching transistors $T_{11}$, $T_{21}$, $T_{31}$, etc., in the logic section. The diode logic circuit comprises three diodes connected in parallel with each other to the collector circuit of each switching transistor and arranged to conduct current away from the collector. The three diodes associated with switching transistor $T_{11}$ are designated $D_a$, $D_b$ and $D_c$. It will be noted that when switching transistor $T_{11}$, for example, is conducting, the anode of each of the diodes $D_a$, $D_b$ and $D_c$ is substantially at ground potential, neglecting the voltage drop in the saturated transistor. Also, when the switching transistor $T_{11}$ is non-conducting, the positive potential of the direct current supply is applied to each of the anodes of diodes $D_a$, $D_b$, $D_c$ through limiting resistor $R_{11}$. Therefore, by connecting the cathode of diode $D_a$ to the base of switching transistor $T_{21}$, the latter is held in a conducting state whenever transistor $T_{11}$ is in a non-conducting state. Similarly, diode $D_b$ is connected to the base of switching transistor 31, insuring that the latter is in a conducting state whenever transistor $T_{11}$ is non-conducting. In like manner, diode $D_c$ is connected to the base of switching transistor 41, insuring that it is in a conducting state whenever transistor $T_{11}$ is non-conducting.

It will be noted that switching transistor $T_{21}$ is likewise provided with three diodes $D_a$, $D_b$ and $D_c$ arranged parallel to each other and with their anodes connected to its collector circuit and interconnected with other of the switching diodes in the logic section to insure the conduction of switching transistors $T_{11}$, $T_{31}$ and $T_{51}$ when $T_{21}$ is non-conducting. Similarly, the switching transistors $T_{31}$, $T_{41}$, $T_{51}$ and $T_{61}$ are each provided with three parallel arrangements of diodes having their anodes connected to the collector circuit of their associated transistor and to the appropriate bases of other of the switching transistors to insure the relative conduction and non-conduction of the switching transistors so interconnected in accordance with the desired criteria for the operation of the switching transistors and, in turn, of the SCR's of one group of the cycloconverter.

It will also be noted that the base of each switching transistor is connected to the collector of three other switching transistors through a logic diode. For example, the base of transistor $T_{11}$ is connected to the collector circuit of transistors $T_{21}$, $T_{31}$ and $T_{41}$. In similar fashion, the base of switching transistor $T_{21}$ is connected to each of the collectors of transistors $T_{11}$, $T_{31}$ and $T_{51}$. It will be apparent that such an arrangement insures that switching transistor $T_{11}$ will be on at all times that either transistor $T_{21}$, $T_{31}$ or $T_{41}$ is non-conducting. Similarly, switching transistor $T_{21}$ will be held conducting at all times when either transistor $T_{11}$, $T_{31}$ or $T_{51}$ is non-conducting. Switching transistors $T_{31}$, $T_{41}$, $T_{51}$ and $T_{61}$ are similarly arranged and their conducting or non-conducting state assured by the diode logic interconnections between their bases and collectors.

From the foregoing, it will be apparent that, at all times, one of the set of three switching transistors $T_{11}$, $T_{21}$ and $T_{31}$ is non-conducting and the other two of the set are conducting. Also, one of the set of switching transistors $T_{41}$, $T_{51}$ and $T_{61}$ is non-conducting and the other two switching transistors of the set are conducting. In addition, if switching transistor $T_{11}$ is conducting, $T_{41}$ is non-conducting and vice versa; if $T_{21}$ is conducting, $T_{51}$ is non-conducting and vice versa; and, if $T_{31}$ is conducting, $T_{61}$ is non-conducting and vice versa. It will be remembered that the presence or absence of a firing signal applied to the gate of each SCR corresponding to the aforementioned switching transistors is inversely related to the conduction state of the switching transistors and that, therefore, the conducting and non-conducting relationships of switching transistors $T_{11}$, $T_{21}$ and $T_{31}$, etc., as forced and insured by unidirectional conducting paths interconnecting various ones of their collector and base circuits as described above in turn forces and insures the desired conducting and non-conducting states of SCR's 1, 2, 3, etc., in accordance with the prescribed criteria.

The interrelated switching transistors are shifted from one to the next successive condition of conduction and non-conduction by turning off one of the two conducting switching transistors in set $T_{11}$, $T_{21}$ and $T_{31}$ and similarly turning off one of the two conducting switching transistors in the set $T_{41}$, $T_{51}$ and $T_{61}$. The two sets of switching transistors are not shifted at the same time as will be apparent from FIGURE 3 showing the conducting and non-conducting states of their six associated, but inversely related, power transistors $T_{12}$ through $T_{62}$.

The turn-off of one of each of the two conducting swtiching transistors in each set is accomplished by applying a spike or peaked pulse to the base of the conducting transistor which is to be turned off. The spikes are produced for each of the switching transistor $T_{11}$, $T_{21}$, $T_{31}$, etc., by a separate and independent differentiating circuit associated with each of them and in circuit between them and the square wave comparator output. Since all the differentiating circuits are identical, a description of one will describe all.

The primary elements of the differentiating circuit comprises a capacitor 50 and a resistor 51 connected in series between a point 52 of potential and the grounded emitter of its associated switching transistor. The potential of point 52 is provided by a voltage divider made up of resistors 53 and 54 connected in series between the positive direct current potential bus $DC_1$ and the ground bus $DC_2$. The base of the associated switching transistor is connected through the diode 55 arranged to conduct away from the transistor. Between diode 55 and the base of the transistor, a biasing resistor 56 is connected to the ground bus $DC_2$. When the point 52 is at a potential determined by the full direct current potential across the voltage divider, capacitor 50 charges through resistor 53 to a steady state value. The square wave voltage pulses from the appropriate one of the comparator bistable flip-flop circuits is applied to each differentiating circuit at point 52.

When the potential of point 52 is reduced to or nearly to ground potential by the turning "on" of its associated transistor in the bistable flip-flop of the preceding comparator stage by means of its interconnecting conductor shown and designated AA, BB, CC, etc., for correlation with FIGURE 4, capacitor 50 discharges through the collector-emitter circuit of the comparator flip-flop transistor and produces a negative pulse at the base of the switching transistor, turning it off and shifting the conducting and non-conducting states of the set of switching transistors to which it belongs. It will be noted that diodes 55 isolate the bases of their switching transistors from any positive pulses produced by the turning off of their interconnected comparator flip-flop tranistors and, thus, prevent the accidental turn-on of a non-conducting switching transistor in the logic section.

In the circuits described above, the various switching transistors are arranged to be turned on by negative pulses. It will be understood, of course, that similar circuits in which corresponding switching transistors are turned on by positive pulses are comprehended as well by this invention. The negative pulse operation is preferred because the inadvertent turning on of a transistor switch arranged to be triggered by a negative pulse seems less likely than one triggered by a positive pulse. Also, in connection with the transistor employed, it will be understood that NPN and PNP transistors may be interchangeably employed if proper attention is given to the polarities involved and that both types of transistors are comprehended by this invention.

In the preferred circuit described, the switching transistors, for example, $T_{11}$, $T_{21}$, $T_{31}$, etc., in FIGURE 5, are arranged to cause a firing pulse to be supplied to their associated SCR by switching to their non-conducting state. In other words, SCR 1 receives a firing pulse when transistor $T_{11}$ turns off and the firing pulse is removed from SCR 1 when transistor $T_{11}$ is on or conducting. This inversion between the condition of the switching transistor and its associated SCR is preferred, though not necessary to the accomplishment of this invention. The preferred arrangement, however, in which the SCR's are held off or non-conducting by an associated switching transistor that is on or conducting results in an arrangement less likely to produce misfires of the SCR's because it is more difficult to inadvertently turn off the switching transistors than to turn them on.

The firing circuit of this invention is useful with both a full-wave, bridge-type cycloconverter power circuit as illustrated in FIGURE 2 and with a half wave power circuit, i.e. a power circuit in which the controlled rectifiers are arranged in a conventional half wave rectifier configuration. In both power circuit arrangements, the logic is arranged to permit the connection of each end of the output circuit to only one phase of the polyphase input circuit at a time. In addition, in the full-wave, bridge-type power circuit, the necessary logic can be provided to prevent the simultaneous turning on of both controlled rectifiers in the same leg of a conducting group, e.g. SCR's 1 and 4. Such a feature prevents putting a short circuit across the load. For example, it will be noted in FIGURE 5 that only two diodes, $D_a$ and $D_b$, are required to insure the sequencing for desired off and on relationships between the three switching transistors of a set, i.e. $T_{11}$, $T_{21}$ and $T_{31}$. The third diode $D_c$ merely insures that two transistors associated with the SCR's in the same leg of the full wave arrangement of SCR's cannot be conducting at the same time.

The logic circuit arrangements mentioned above with respect to that part of the circuit which permits one side of the load to be connected to only one phase of the input at a given time and which, further, prevents the connection of the load to any other phases, e.g. the logic controlling and relating the conducting and non-conducting states of SCR's 1, 2 and 3 is arranged and has been described as operating in an "off turning" mode. By this, it is meant that the conductive state of a set of switching transistors is changed by a signal turning off one of the on transistors which acts through the interconnecting logic circuitry to turn on the only other transistor in the off conditon. In other words, the signal for changing the relationship must be applied to the correct on transistor in the first instance after which the off transistor to be turned on is automatically selected. The logic may be arranged and the circuit operated in the "on turning" mode in which the state-changing signal is always applied to the non-conducting transistor which then turns off the desired one of the two other conducting transistors. In this case, there is no choice of transistors to which the state-changing signal is to be applied. The choice comes in the second step in which one of the two conducting transistors must be selected as the transistor to be turned off. Either arrangement can be made to work equally well, though it is preferred to employ the "off turning" method together with transistor switches arranged to respond to negative trigger pulses.

Those skilled in the art will appreciate that various changes and modifications can be made in the apparatus described herein without departing from the spirit and scope of the invention.

We claim:

1. In a cycloconverter having
   a polyphase alternating current supply input circuit,
   a single phase load output circuit,
   a pair of parallel unidirectional paths each extending between and interconnecting all phases of said input and said output circuits and arranged to conduct current therebetween in opposite directions and in alternation, each of said paths comprising a group of controlled rectifiers arranged to connect said output circuit to each of said input circuit phases and to permit and prevent conduction of current therebetween in one direction in response to appropriate control signals applied to each of them and to prevent conduction therebetween in the other direction, the combination with said controlled rectifiers of a system means connected to said controlled rectifiers for providing appropriate control signals to them, said system means including logic means associated with all of said controlled rectifiers in one of said groups and a logic means associated with all of said controlled rectifiers in the other of said groups, both of said logic means being operative to insure that said system means provide only such conduction and non-conduction control signals to said controlled rectifiers of each associated group as forces the connection of each side of said load circuit to only one phase of said input circuit at a time during substantially all of the conducting period of each group.

2. In a cycloconverter having
a polyphase alternating current supply input circuit,
a single phase load output circuit,
a pair of parallel unidirectional paths each extending between and interconnecting all phases of said input and said output circuits and arranged to conduct current therebetween in opposite directions and in alternation, each of said paths comprising a group of controlled rectifiers arranged to connect said output circuit to each of said input circuit phases and to permit and prevent conduction of current therebetween in one direction in response to appropriate control signals applied to each of them and to prevent conduction therebetween in the other direction, the combination with said controlled rectifiers of a system means for providing control signals to said controlled rectifiers, said system means including a switching means associated and connected with each of said controlled rectifiers for providing conduction and non-conduction signals to its associated controlled rectifier, a logic means associated with and interconnecting all of said switching means associated with all of said controlled rectifiers in one of said groups and a logic means associated with and interconnecting all of said switching means associated with all of said controlled rectifiers in the other of said groups, both of said logic means being operative to insure that said switching means associated with each of said groups provide only such conduction and non-conduction control signals to said controlled rectifiers of their associated group as forces the connection of each side of said load circuit to only one phase of said input circuit at a time during substantially all of the conducting period of each group.

3. The apparatus according to claim 2 in which the conduction state of each of said switching means is inverted from that of its associated controlled rectifier.

4. The apparatus according to claim 2 in which said system means includes a direct current voltage source and each of said switching means comprises a transistor switch having a base and having a collector and emitter connected across said voltage source and a collector output circuit connected to its associated controlled rectifier for providing a conduction control signal when the collector-emitter circuit of said switching transistor is not conducting and for providing a non-conduction control signal when the collector-emitter circuit is conducting.

5. The apparatus according to claim 4 in which each of said logic means comprises a plurality of connecting conducting paths extending between and connecting the base of each switching transistor and the collector circuits of every other switching transistor comprising each set of switching transistors associated with all controlled rectifiers within the associated group that are arranged to conduct in the same direction with respect to said output circuit, said paths all including a unidirectional impedance arranged to conduct current in the same direction with respect to said collector.

6. The apparatus according to claim 5 in which said plurality of connecting conducting paths comprising said logic means includes connecting conducting paths extending between and connecting the base of each switching transistor and the collector circuits of every other switching transistor associated with controlled rectifiers within the same one of said groups and which switching transistors are connected to the same phase of the polyphase alternating current supply.

7. In a cycloconverter having
a polyphase input circuit,
a single phase load output circuit,
a polyphase alternating current supply frequency voltage source connected to said input circuit,
a reference frequency voltage source,
a pair of parallel unidirectional paths each extending between and interconnecting all phases of said input and said output circuits and arranged to conduct current therebetween in opposite directions and in alternation, each of said paths comprising
    a group of controlled rectifiers arranged to connect said load to each of said input phases and to permit and prevent conduction of current therebetween in one direction in response to appropriate control signals applied to each of them and to prevent conduction therebetween in the other direction, each of said groups comprising at least one set of controlled rectifiers consisting of all controlled rectifiers arranged to conduct in one direction with respect to said output circuit, the combination with said controlled rectifiers of a system means for providing control signals to said controlled rectifiers, said system means including a voltage mixing means for algebraically combining voltages proportional to each phase voltage of said polyphase supply frequency voltage source and said reference frequency voltage to provide a plurality of unique output voltages each corresponding to a controlled rectifier comprising said groups and containing information relating the desired times of beginning of the conduction signals for its corresponding controlled rectifier to each other and to those for the other controlled rectifiers, a bistable switching means having main electrodes in conduction and non-conduction signal supplying relationship with each of said controlled rectifiers for providing conduction and non-conduction signals to its related controlled rectifier and in signal controlling relationship with all other switching means related to a controlled rectifier in the same set as its own controlled rectifier, each of said switching means having a controlling electrode connected to a corresponding one of said plurality of output voltages of said voltage mixing means, whereby said switching means supplies conduction initiating signals to its associated controlled rectifier in response to the voltage signal applied to its control electrode by said voltage mixing means.

8. The apparatus according to claim 7 in which said signal controlling relationships between all of said bistable switching means related to a controlled rectifier in the same set of controlled rectifiers comprise unidirectional conducting paths connecting the controlling electrode of each of said switching means to a main electrode of the other ones of said switching means so that when any one of said switching means is in one of the two stable states of said switching means all of the other of said switching means are in the other of said two stable states of said switching means.

9. The apparatus according to claim 8 in which said plurality of conducting paths interconnecting said switching means are arranged so that said switching means are switched from one to the other of their stable states by an output voltage from said voltage mixing means applied to their controlling electrodes and so that said switching means are switched from the other to one of the two stable states by a signal applied to their controlling electrodes by way of one of said unidirectional conducting paths.

References Cited

UNITED STATES PATENTS

| | | | |
|---|---|---|---|
| 3,210,569 | 10/1965 | Reek | 307—88 |
| 3,253,158 | 5/1966 | Horgan | 307—88 |
| 3,283,256 | 11/1966 | Hurowitz | 307—88 |

FOREIGN PATENTS 110,205  9/1960  Pakistan.

JOHN F. COUCH, *Primary Examiner.*

W. M. SHOOP, Jr., *Assistant Examiner.*